July 29, 1958 L. S. BENSKY ET AL 2,845,220

ELECTRONIC COMPARATOR DEVICE

Filed June 27, 1952

INVENTORS.
LOWELL S. BENSKY &
LINDER C. HOBBS
BY Morris Raskin
ATTORNEY

United States Patent Office 2,845,220

Patented July 29, 1958

2,845,220

ELECTRONIC COMPARATOR DEVICE

Lowell S. Bensky and Linder C. Hobbs, Haddonfield, N. J., assignors to Radio Corporation of America, a corporation of Delaware Application June 27, 1952, Serial No. 296,056

7 Claims. (Cl. 235—61)

This invention relates to electronic equality comparators and more particularly is an improved system for comparing two numbers to determine whether or not they are identical.

The comparing of two numbers or two groups of signals is a function which occurs a large number of times throughout any electronic computer. As an illustration, information is usually stored in an information handling machine with the various portions of the information being identified by some identifying code designations which may also be termed the address code. To call out information from a computer, signals are applied which correspond to the address of the information desired. The applied signals and the successively read out address signals are compared until coincidence occurs at which time the information stored at that particular address is read out. Some apparatus must be provided for the purpose of comparing successive identifying codes with the applied signals to determine when they are both identical. This is a simple illustration of the operation of an equality comparator.

It is well known that the preferred system for expressing information, numbers, etc. which are to be handled by a computer is the binary system. Accordingly, two numbers or items to be compared are usually expressed in the binary code. Equality comparators may be used for other functions such as computer programming by signifying the end of an operation or the commencement of an operation, if desired, etc.

It is an object of this invention to provide a novel equality comparator to compare two items expressed in the binary code.

It is a further object of this invention to provide an inexpensive system for comparing two items.

Still a further object of this invention is to provide simple and improved apparatus which can compare two items rapidly and provide an output when they are equal.

These and other objects of the invention are achieved by providing a system wherein there are a first set of gates, each of which is associated with a binary digit position in a first coded item to be compared. There is also provided a second set of gates, each of which is associated with a binary digit position of a second coded item to be compared with the first. A set of flip-flops or trigger circuits is then provided. Each trigger circuit is connected to the output of one gate from the first set and one gate from the second set (which correspond to the same binary digit position in the item code). The output of the trigger circuits is applied to a detecting device which consists of a plurality of diodes which are connected from each one of the trigger circuits to a common output point.

A timing pulse source is employed. Each item is represented by electrical signals which consist of a group of direct current levels having inhibiting and non-inhibiting effects and corresponding to the "1's" and "0's" in each of the numbers. The electrical signals for the two numbers are respectively applied to the first and second pluralities of gates, thus priming those of the gates to which non-inhibiting levels are applied. A first timing pulse is applied to all the trigger circuits to establish them in the first of their stable conditions. A second timing pulse is applied to the first group of gates. This has the effect of applying pulses from the non-inhibited gates to the respectively associated trigger circuits to drive them to their second stable condition. A third timing pulse is applied to the second group of gates. This has the effect of causing pulses to be derived from the non-inhibited gates. These pulses are applied to the respectively associated trigger circuits and those of the trigger circuits which are in their second stable state are restored to their first stable state. Those of the trigger circuits which are in the first stable state are driven to their second stable state. A fourth timing pulse is applied to the detecting circuit or to one of the diodes connected to the output circuit. If all the trigger circuits are in their first stable state, an output pulse is provided indicating both items or numbers are equal, since their effects effectively cancel each other in the trigger circuits. If any one of the trigger circuits is not reset to its first stable condition, this is indicated by the failure of the detector to pass the fourth timing pulse.

The novel features of the invention as well as the invention itself, both as to organization and method of operation, will best be understood from the following description when read in connection with the accompanying drawings, in which.

Figure 1:
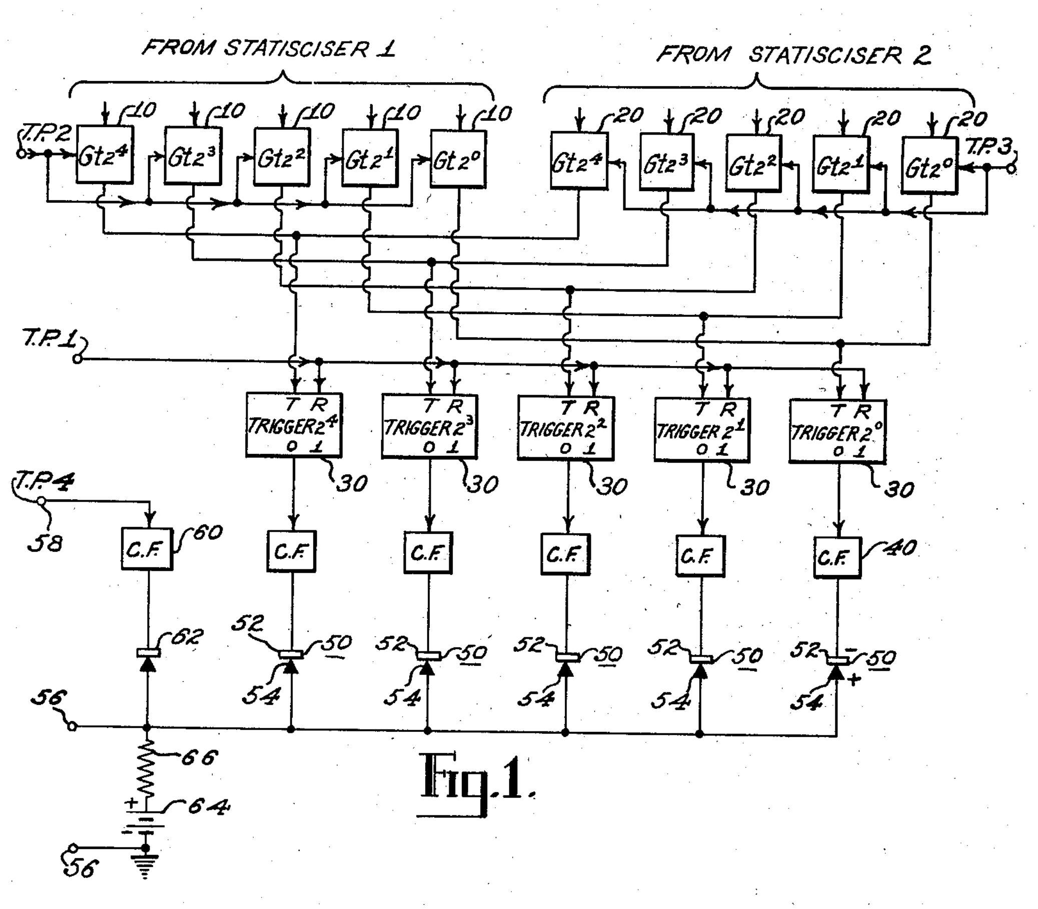
Figure 1 is a schematic diagram of the invention.

This circuit diagram illustrates one operation of the schematic diagram shown in Figure 1. Referring now to Figure 1 of the drawings, there may be seen a plurality of rectangles having two inputs each and representing a plurality of first gates 10. Similarly there is seen a plurality of second gates 20 represented by rectangles. These gates also require two inputs to provide an output. Each one of the gates 10, 20 in the first and second pluralities is associated with a binary digit position in a number, as shown by the number inside the rectangle. There is also shown a plurality of rectangles representative of trigger circuits 30. The corresponding gates representing the corresponding binary digit position in each of the two numbers have their outputs connected to a trigger circuit which is associated therewith. Connection between the gates and the trigger circuits is such that the trigger circuit is driven from a first stable condition to a second stable condition by the application of a first pulse and from a second stable condition to the first stable condition by the application of a second pulse. The output of each trigger circuit for its first stable condition, which is signified by the "O" positioned at the output, is connected to a rectangle designated as C. F. 40 and standing for "cathode follower." The output from each cathode follower 40 is applied to the cathode 52 of a rectifier 50. The anode 54 of each rectifier is connected to a common output terminal 56. A timing pulse terminal 58 is connected to another cathode follower 60, the output from which is connected through another rectifier 62 to the output terminal. A bias 64 is applied, through a resistor 66, to the output terminal with such polarity that normally in the absence of any pulse being applied to the timing pulse terminal 58, diode 62 is maintained conducting.

Normally, within any digital computer, binary signals have their "1's" represented by a postive potential and their "0's" represented by a negative potential or vice versa. Some digital computers use the system whereby the "1" is represented by a positive potential and the "0" by the absence of a potential. In any event, one digit representative direct current level may be considered as non-inhibiting and the other as the inhibiting level. These direct current signals exist in parallel and are presented simultaneously along a number of parallel tracks. Statiscisers or shifting registers (not shown) may be used as sources for the required signals. These are well known in the computer art and may be found described in an article by A. D. Booth on "The physical realization of an electronic digital computer," which appears in Electronic Engineering, December 1950, pp. 492–498.

The system described herein is one that operates with the parallel type of presentation of digital numbers. Systems are known for converting serial digital representations into parallel digital representations. Therefore, this invention is not strictly limited to its use with a serial digital representation.

Two digital numbers, which are to be compared, have their electrical representations applied to the respective first and second sets of gates. In accordance with the system employed, some of the digits will be represented by inhibiting levels and others of the digits will be represented by non-inhibiting levels. The non-inhibiting levels serve to prime the gates to which they are applied. A timing pulse source, not shown herein, is employed to provide a train of timing pulses. This timing pulse source is well known in the art and may consist of pulses derived from a magnetic drum which times the operation of a computer, or if desired may be provided by any well known type of counter, for example, the one shown in Reich, "Theory and Applications of Electron Tubes," page 487, published by McGraw-Hill Book Co. In any event, the timing pulse source required herein is one which provides a timed sequence of at least four timing pulses, each pulse of which may be applied to perform or time a different operation. The first of these pulses is simultaneously applied to all the trigger circuits to the terminal marked R, standing for "reset" so that the trigger circuits are simultaneously established in their first stable condition. The second of these timing pulses is applied simultaneously to the first plurality of gates 10. Thus all those gates which are primed will provide an output pulse which serves to turn over the associated trigger circuit, thus driving it to its second stable condition. It is to be noted that the configuration taken up by the trigger circuits corresponds to the configuration of the binary number represented by the electrical signals. A third of the timing pulses is applied to each one of the plurality of second gates 20 simultaneously. This serves to apply pulses from those of the second gates which are primed to their corresponding trigger circuits. These pulses reset all of the trigger circuits which are in the second condition of stablity and drive to the second condition of stability all those trigger circuits which were unaffected by the action of the first plurality of gates. Accordingly, if the second number is the same as the first number, all the trigger circuits are restored to their initial or first condition of stability. If the first two numbers are dissimilar, then one or more of the trigger circuits will be in its second condition of stability. If all the trigger circuits are in their first condition of stability, a positive signal is applied to each one of the cathode followers, thus maintaining the diodes associated with them substantially cut off. Each one of the following diodes is accordingly non-conducting, since rise in cathode potential will assure this condition. However, since diode 62 still conducts, the output terminal 56 is still clamped to a low potential. Accordingly, when a fourth timing pulse is applied to the cathode follower 60 connected to the timing pulse terminal 58 (this being the fourth timing pulse), it will serve to cause the diode 62 connected to this cathode follower to become cut off, thus allowing the potential at the output terminal to rise up to the level of the bias potential 64, and a positive output pulse is provided. If any one of the trigger circuits is in its second stable condition, the cathode follower connected thereto has a negative potential applied to its grid. The diode connected to its cathode accordingly conducts and thus clamps the output terminal potential to a low value. Thus a positive pulse applied to the timing pulse terminal will not pass through, since one or more of the diodes connected to the terminal are already in conducting condition.

Figure 2:
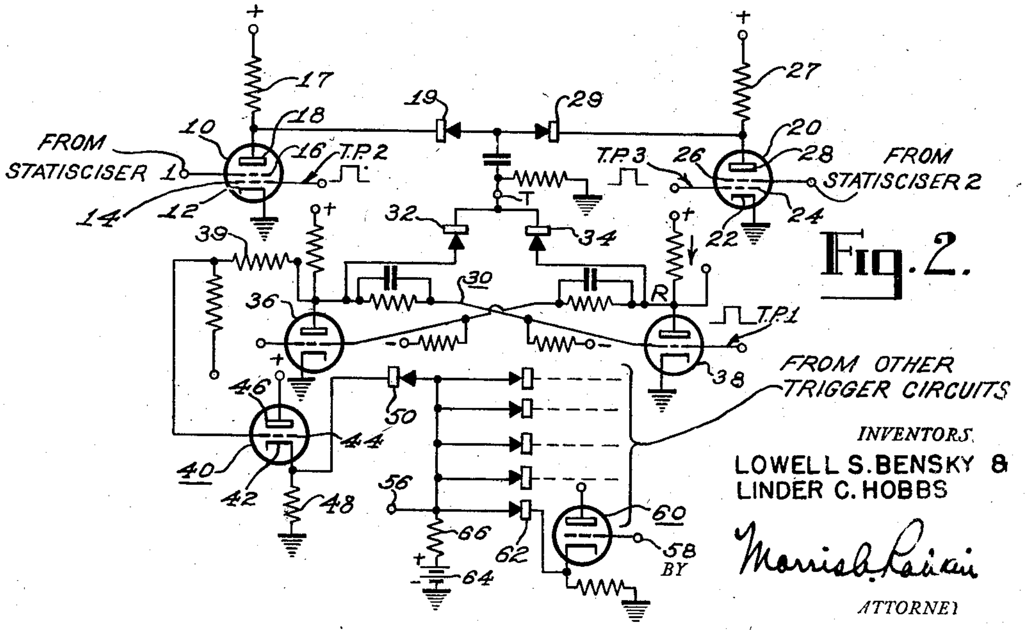
Figure 2 is a circuit diagram of one of the gates in the first and second group showing its connection to the trigger circuit associated therewith and the trigger circuit output circuit.

Reference is now made to Fig. 2 which shows a circuit diagram of a gate tube 10 typical of any one of the first plurality of gates and a gate tube 20 typical of any one of the second plurality of gates, coupled to a typical trigger circuit 30. Each of the gate tubes has a cathode 12, 22 and two control grids 14, 16 and 24, 26. The electrical signal representing a digit for the binary digital position is applied to one of the control grids 16, 26. Each of the timing pulses may be applied to the other of the control grids 14, 24 of the two gate tubes. The anodes 18, 28 of the two gate tubes are connected through separate anode load resistors 17, 27 to B+. Coupling diodes 19, 29 are also connected between the anode of each of the gate tubes and an input terminal to the trigger circuit 30. The input terminal is coupled to the junction point of the diodes through a condenser. A resistor is connected from this point to ground. The trigger circuit is of the general type well known in the art and its design and operation may be found described in "Theory and Applications of Electron Tubes," by Reich, on page 356, published by McGraw-Hill Book Co., New York. Connection is made to the tube grids of the two tubes 36, 38 in the trigger circuit 30 through two coupling diodes 32, 34. A negative bias is applied to each of the trigger circuit grids through grid leak resistors. Cross-coupling between the anodes and grids of the two tubes is provided by means of resistors shunted by condensers. The trigger circuit is of the type known as the bistable state trigger circuit wherein a first input pulse will drive it to one condition of stability and a second input pulse to a second condition of stability. In the circuit as shown, the first condition of stability is with the trigger circuit tube 38 on the right side conducting. Output is taken from the tube 36 on the left side of the trigger circuit shown in the drawing. This is designated as the "O" tube. This output is coupled through a resistor 39 to the grid 44 of a cathode follower tube 40. The cathode follower tube has a cathode load resistor 48 connected to its cathode 42. A diode 50 is connected between the cathode of the cathode follower and the output terminal 56. It is to be understood that one of the first gate tubes 10 and one of the second gate tube 20 is provided for each binary digital position. One trigger circuit 30 is provided for each binary digital position or first and second gate tubes, one cathode follower 40 is provided for each trigger circuit and one diode 50 connected to the cathode follower cathode is provided for each trigger circuit. A terminal is provided for the application of the fourth timing pulse. This is connected through another cathode follower tube 60 and another diode 62 to the output terminal. Clamping bias is applied to the output terminal 56 through a resistor 66. From the circuit diagram of Figure 2 it can be seen that the trigger circuit is driven to its first stable condition by a first timing pulse applied to the grid of tube 38; to its second stable condition by the output pulse from the first gate tube 10 if the tube was primed to its first stable condition. The trigger circuit is driven to its first stable condition again by an output pulse from the second gate tube 20 if the tube was primed. The cathode follower tube is rendered conducting if the trigger circuit is in its first stable condition. Accordingly, the associated diode is biased off and a fourth timing pulse will cause the last diode to become non-conductive, thus providing a positive output pulse.

There has been shown and described hereinabove a binary coded item comparator wherein two numbers represented electrically may be compared for equality. The system is novel, simple, efficient and extremely useful.

What is claimed is:

1. A system for comparing a first and a second binary coded item comprising a plurality of trigger circuits in independent stages, each of said circuits having a first and a second stable state, each of said trigger circuits being associated with the same binary digit position in both said items, a source of timing pulses, means to set all said trigger circuits to said first stable state responsive to a first of said timing pulses, means responsive to a second of said timing pulses to drive to said second stable state all those of said trigger circuits associated with the binary digit positions in said first item which are binary ones, means responsive to a third of said timing pulses to restore to said first state all those of said trigger circuits which are in their said second stable state and which are associated with the binary digit positions in said second item which are binary ones and to drive all the remaining so associated trigger circuits to their said second stable state, and means responsive to a fourth of said timing pulses to detect the restoration of all said triggers to their said first stable condition.

2. A system for comparing a first and a second binary coded number comprising a plurality of first gates, a plurality of second gates, each of said first and second gates being respectively associated with a different one of the corresponding digit positions in said first and second numbers, a plurality of bistable state trigger circuits in independent stages, each of said circuits having a first and second stable state and having an input and an output, each of said trigger circuits being associated with a corresponding digit position in said first and second numbers, means to couple each of said first gates and each of said second gates to the input of the trigger circuit which is associated with the binary digit position corresponding to the binary digit positions with which said gates are associated, a source of timing pulses, means to apply a first of said pulses to said plurality of trigger circuits to establish them in said first state, means to apply signals representative of the digits of said first number to said plurality of first gates to prime all the ones of said first gates which receive one type of digit representative signal, means to apply signals representative of the digits of said second number to said plurality of second gates to prime all the ones of said second gates which receive said one type of digit representative signal, means to apply a second of said timing pulses to said plurality of first gates to derive outputs from said primed first gates whereby the trigger circuits coupled thereto are driven to said second of said bistable states, means to apply a third of said timing pulses to said second plurality of gates to derive outputs from said primed second gates whereby the trigger circuits coupled thereto which have received outputs from said first gates are restored to their said first stable state and the trigger circuits which have not received any of the outputs from said first gates are driven to said second state, a coincidence gate, means to couple said coincidence gate to the outputs of all said trigger circuits to be biased closed by any of said trigger circuits in said second state, and means to apply a fourth of said timing pulses to said coincidence gate to derive an output therefrom only when said gate is open.

3. A system for comparing two binary numbers comprising a plurality of independent comparing means each having a first and a second stable state, each of said comparing means being associated with the same binary digit position in each of said two numbers, a plurality of first gates each of which is associated with a binary digit position in said first number, a plurality of second gates each of which is associated with a binary digit position in said second number, a source of timing pulses, means to place all said comparing means in said first stable state responsive to a first of said timing pulses, means to drive to said second stable state through said first gates responsive to a second of said timing pulses those of said comparing means associated with binary digit positions in said first number which have the same one of two binary digits, means to drive to said first stable state through said second gates responsive to a third of said timing pulses those of said comparing means associated with the same binary digit positions in said second number as in said first number which have said same one of two binary digits, and means responsive to a fourth of said timing pulses to detect whether said comparing means are all in said first stable state.

4. A system for comparing two numbers as recited in claim 3 wherein said coincidence gate comprises a plurality of rectifiers, and an output terminal, a different one of said plurality of rectifiers being connected between said output terminal and the output of each of said trigger circuits, the last one of said plurality of rectifiers being connected from said output terminal to receive said fourth timing pulse.

5. A system for comparing two numbers as recited in claim 4 wherein the output of each of said trigger circuits includes an electron discharge tube having an anode control grid and cathode electrodes, a separate cathode load resistor connected to the cathode of each of said tubes, each of said rectifiers being connected to a different one of the cathodes of said tubes.

6. A system for comparing two numbers as recited in claim 3 wherein each of said means to couple each of said first gates and each of said corresponding digit position second gates to each of said associated trigger circuits include a pair of rectifiers, one of said rectifier pair being connected between a trigger circuit and the associated first gate, the other of said rectifier pair being connected between said trigger circuit and its associated second gate.

7. A system for comparing two numbers comprising a plurality of first electron discharge tubes, each of which has an anode, cathode, and two control grids, each of said tubes being associated with a binary digit position in a first of said two numbers, a plurality of second electron discharge tubes, each of which has an anode, cathode and two control grids, each of said tubes being associated with a binary digit position in the second of said two numbers, a plurality of independent trigger circuits each having a first and a second stable state, each having an input and a first stable condition output, diode means coupling the input of each trigger circuit with different ones of the anodes of a first tube and a second tube associated with the same binary digit position, a plurality of third electron discharge tubes each having an anode, cathode and control grid, the output from each of said trigger circuits being coupled to the control grid of a different one of said third tubes, a timing pulse terminal connected to the grid of a last one of said third tubes, a plurality of cathode load resistors each connected to the cathode of a different one of said tubes, a plurality of diodes, an output terminal, each of said diodes being connected between a different one of the cathodes of said third tubes and said output terminal, means to generate electrical signals comprising inhibit and non-inhibit voltage values representative of each of the binary digits of said two numbers, means to respectively apply each of said digit signals representing said first number to one control grid in each of said first tubes associated with the respective binary digit positions in said first number, means to respectively apply each of said second number digit representative signals to a control grid in each of said second tubes associated with said second number binary digits sequence pulse generating means, means to apply a first of said sequence generated pulses simultaneously to all said trigger circuits to establish all of them in said first condition of stability, means to apply a second of said sequence generated pulses to the second control grid in all said plurality of first tubes to provide output pulses from those of said first tubes to which inhibiting voltages are not applied to drive to said second state the trigger circuits to which output pulses from said first tubes are applied, means to apply a third of said sequence generated pulses to the second control grid in all said second tubes to provide output pulses from those of said second tubes not having inhibiting voltages applied thereto whereby the trigger circuits to which output pulses from said second tubes are applied are restored to said first stable condition if in said second stable condition and are driven to said second stable condition if in said first stable condition, and means to apply a fourth of said sequence generated pulses to said timing pulse terminal to provide an output at said output terminal if all said trigger circuits are in said first stable condition.

References Cited in the file of this patent

UNITED STATES PATENTS

| | | |
|---|---|---|
| 2,539,043 | Verneaux | Jan. 23, 1951 |
| 2,615,127 | Edwards | Oct. 21, 1952 |

FOREIGN PATENTS

| | | |
|---|---|---|
| 994,531 | France | Nov. 19, 1951 |